No. 897,849. PATENTED SEPT. 1, 1908.
C. H. PRESCOTT.
GREASE CUP.
APPLICATION FILED DEC. 17, 1907.

Witnesses

Inventor
C. H. Prescott
By
Attorneys

UNITED STATES PATENT OFFICE.

CHARLES H. PRESCOTT, OF EAST LIVERPOOL, OHIO.

GREASE-CUP.

No. 897,849.

Specification of Letters Patent.

Patented Sept. 1, 1908.

Application filed December 17, 1907. Serial No. 406,886.

*To all whom it may concern:*

Be it known that I, CHARLES H. PRESCOTT, citizen of the United States, residing at East Liverpool, in the county of Columbiana and State of Ohio, have invented certain new and useful Improvements in Grease-Cups, of which the following is a specification.

This invention comprehends certain new and useful improvements in grease cups for engines, and relates particularly to a cup of this character designed for a steam or other engine of the reciprocating type and designed to be automatically actuated by the movements of the cross head of the engine to positively feed the grease, either hard or soft, to the part or parts to be lubricated.

The invention has for its object a simple, durable and efficient construction of grease cup of this character which is composed of comparatively few parts that will not be liable to get out of order, and the invention consists in certain constructions, arrangements and combinations of the parts that I shall hereinafter fully describe and then point out the novel features in the appended claims.

Figure 1:
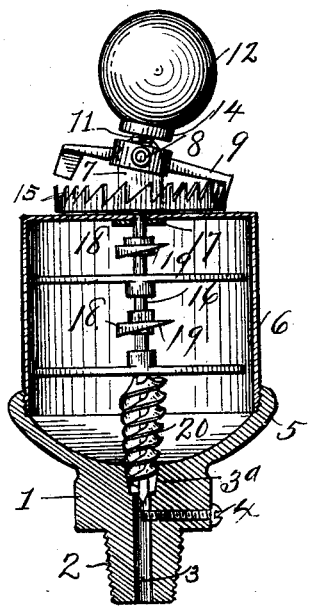
Figure 2:
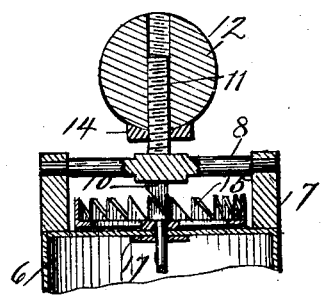
Figure 3:
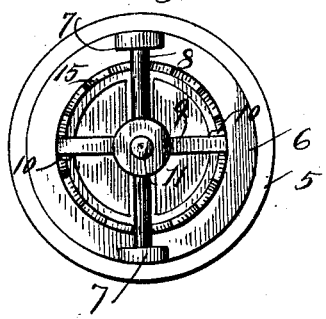
Figure 4:
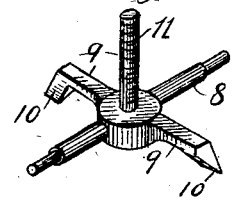

For a full understanding of the invention, reference is to be had to the following description and accompanying drawings, in which:

Figure 1 is a side elevation of my improved grease cup with parts in section; Fig. 2 is a sectional view of the upper end of the cup at right angles to Fig. 1; Fig. 3 is a top plan view; and, Fig. 4 is a detail perspective view of a portion of the escapement mechanism.

Corresponding and like parts are referred to in the following description and indicated in all the views of the drawings by the same reference characters.

Referring to the drawing, the numeral 1 designates the shank of the cup which is formed with a reduced threaded extremity 2 by which it may be secured to a crank or cross-head of an engine, and 3 designates the bore of said shank designed to feed the grease to the parts to be lubricated and formed with an enlarged upper end 3ª. The bore 3 may be regulated so as to vary the feed, by means of a regulating screw 4 working through the shank 1 into the bore, as clearly illustrated in the drawing. The dish-shaped base 5 of my improved grease cup is preferably formed integrally with the shank 1 and is arranged for screw-threaded connection with the body portion 6 of the cup, said body portion being cylindrical in the present instance, as shown. The body portion 6 is formed at its upper end with bearing posts 7, in which the transversely extending shaft 8 is journaled to rock about its longitudinal axis in a vertical plane. The shaft 8 carries oppositely extending rocker-arms, each of which is formed at its extremity with a downwardly projecting lug or pawl 10. A stem 11 projects upwardly from the shaft 8 and is preferably threaded, and a ball or other weight 12 is secured by threaded engagement, or otherwise on the stem, a jam nut 14 being mounted on the stem below the weight.

The pawls 10 are intended to work alternately against a toothed plate 15 which is horizontally-disposed on the upper end of a vertical shaft 16 journaled in the top of the body portion 6 of the grease cup, by means of the said plate above the top and a collar 17 below the top. The shaft 16 carries a series of radially-disposed blades 18, each of which is formed with a beveled lower face 19, so that as the shaft rotates, the revolving arms will cut the grease and force it downwardly within the cup. At its lower end the shaft 16 carries a worm 20 which works within the chamber formed by the enlarged upper end of the bore 3 and which, therefore, feeds the grease positively down through the bore to the part or parts to be lubricated thereby.

In the practical operation of my improved grease cup, the reciprocation of the crank or cross head will obviously effect the oscillation of the ball or other weight 12, and thereby rock the arms 9 and effect an intermittent rotary movement of the ratchet wheel 15, thereby turning the shaft 16 and forcing the knives 18 through the grease to force the same downwardly towards the worm 20, the latter positively feeding the grease down through the bore 3 to automatically feed the lubricant to the desired part.

From the foregoing description in connection with the accompanying drawing, it will be seen that I have provided a very simple and efficient construction of grease cup for engines which will work automatically and positively to feed either hard or soft grease to the part or parts to be oiled, and which will require very little, if any, attention, except to replenish the supply of grease, this being readily effected by the mere detachment of the body portion 6 from the base 5.

Having thus described the invention, what is claimed as new is:

1. In a grease cup, the combination of a shaft provided with feeding means, a ratchet wheel secured to said shaft, a transverse shaft journaled to rock about its longitudinal axis on said cup, an arm secured to said shaft and extending perpendicularly to the longitudinal axis thereof, a stem projecting upwardly from the transverse shaft, a weight secured to said stem, and a pawl carried by said arm and adapted to engage said ratchet.

2. In a grease cup, the combination of a shaft provided with feeding means, a ratchet wheel secured to said shaft, an oscillatory weight mounted on the cup, and oppositely extending arms movable with said weight and adapted to be rocked thereby, each of said arms carrying a pawl designed for engagement with said ratchet.

3. A grease cup of the character described, comprising a shank provided with a base and formed with a bore, a body portion connected to said base, a shaft mounted to turn in said body portion, a worm carried by the lower end of said shaft and working in said bore, knives secured to said shaft above the worm, a ratchet connected to said shaft and mounted on the top of the body portion, an oscillatory weight mounted on the top of the body portion, and a rocker arm movable with said weight and provided with a pawl arranged for engagement with said ratchet.

4. In a grease cup of the character described, the combination of a shaft mounted to turn in the cup, a worm secured to the lower end of said shaft, radially disposed blades secured to said shaft above the worm and formed with beveled lower faces, and means for automatically imparting an intermittent rotary movement to said shaft.

In testimony whereof I affix my signature in presence of two witnesses.

CHARLES H. PRESCOTT. [L. S.]

Witnesses:
M. J. KERR,
L. W. CARMAN.